(12) United States Patent
Brendel et al.

(10) Patent No.: US 10,184,395 B2
(45) Date of Patent: Jan. 22, 2019

(54) MULTI-JOINT CRANK DRIVE OF AN INTERNAL COMBUSTION ENGINE, AND CORRESPONDING INTERNAL COMBUSTION ENGINE

(71) Applicant: AUDI AG, Ingolstadt (DE)

(72) Inventors: Matthias Brendel, Ingolstadt (DE); Markus Meyer, Mildenau (DE)

(73) Assignee: AUDI AG, Ingolstadt (DE)

( * ) Notice: Subject to any disclaimer, the term of this patent is extended or adjusted under 35 U.S.C. 154(b) by 118 days.

(21) Appl. No.: 15/118,699

(22) PCT Filed: Feb. 13, 2015

(86) PCT No.: PCT/EP2015/000317
§ 371 (c)(1),
(2) Date: Aug. 12, 2016

(87) PCT Pub. No.: WO2015/120987
PCT Pub. Date: Aug. 20, 2015

(65) Prior Publication Data
US 2017/0058765 A1    Mar. 2, 2017

(30) Foreign Application Priority Data

Feb. 14, 2014   (DE) .................. 10 2014 002 022

(51) Int. Cl.
*F02B 75/04* (2006.01)
*F16F 15/26* (2006.01)
*F16F 15/28* (2006.01)

(52) U.S. Cl.
CPC ............ *F02B 75/045* (2013.01); *F16F 15/26* (2013.01); *F16F 15/283* (2013.01)

(58) Field of Classification Search
CPC ........ F02B 75/045; F16F 15/283; F16F 15/26
See application file for complete search history.

(56) References Cited

U.S. PATENT DOCUMENTS

| 8,978,616 B2 | 3/2015 | Brendel | |
| 2002/0026910 A1* | 3/2002 | Hiyoshi | F02B 75/045 123/48 B |

(Continued)

FOREIGN PATENT DOCUMENTS

| DE | 10 2005 054 761 A1 | 5/2007 | |
| DE | 102010032441 A1 * | 2/2012 | ............ F02B 75/048 |

(Continued)

OTHER PUBLICATIONS

International Search Report issued by the European Patent Office in International Application PCT/EP2015/000317.

*Primary Examiner* — Jacob Amick
*Assistant Examiner* — Charles Brauch
(74) *Attorney, Agent, or Firm* — Henry M. Feiereisen LLC (57) ABSTRACT

A multi-joint crank drive of an internal combustion engine includes at least one coupling member rotataby supported on a crankpin of a crankshaft for rotation about a coupling member rotation axis; and at least one connecting rod supported on a crankpin of an eccentric shaft for rotation about an eccentric rotation axis, wherein the coupling member is connected with a piston rod of a piston of the internal combustion engine for pivoting about a piston rod rotation axis and with the connecting rod for rotation about a connecting rod rotation axis, said coupling member having a bearing eye receiving the crankpin of the crankshaft, wherein a coupling angle between an imagined straight line though the coupling member rotation axis and the connecting rod rotation axis and an imagined straight line through the coupling member ration axis and the piston rod rotation axis is at least 140° and at most 180°, wherein a center point of the coupling member is arranged outside the bearing eye, and on a side of a first plane which faces the piston of the (Continued)

internal combustion engine, said first plane receiving the coupling member rotation axis and the connecting rod rotation axis.

7 Claims, 4 Drawing Sheets

(56) References Cited

U.S. PATENT DOCUMENTS

| | | | |
|---|---|---|---|
| 2009/0000598 A1* | 1/2009 | Bach | F02B 75/048 |
| | | | 123/48 B |
| 2012/0285412 A1 | 11/2012 | Brendel et al. | |
| 2015/0330314 A1 | 11/2015 | Brendel | |

FOREIGN PATENT DOCUMENTS

| | | |
|---|---|---|
| DE | 10 2011 116 609 | 4/2013 |
| EP | 1 180 588 A2 | 2/2002 |
| EP | 1 215 380 A2 | 6/2002 |
| EP | 1 760 289 A2 | 3/2007 |
| JP | 2004 124775 A | 4/2004 |

* cited by examiner

MULTI-JOINT CRANK DRIVE OF AN INTERNAL COMBUSTION ENGINE, AND CORRESPONDING INTERNAL COMBUSTION ENGINE

CROSS-REFERENCES TO RELATED APPLICATIONS

This application is the U.S. National Stage of International Application No. PCT/EP2015/000317, filed Feb. 13, 2015, which designated the United States and has been published as International Publication No. WO 20151120987 and which claims the priority of German Patent Application, Serial No. 10 2014 002 022.3, filed Feb. 14, 2014, pursuant to 35 U.S.C. 119(a)-(d).

BACKGROUND OF THE INVENTION

The invention relates to a multi-joint crank drive of an combustion engine with at least one coupling member which is supported on a crankpin of a crank shaft for rotation about a coupling member rotation axis, and at least one connecting rod supported on a crankpin of an eccentric shaft for rotation about an eccentric shat rotation axis, wherein the coupling member is connected with a piston rod of a piston of the combustion engine for pivoting about a piston rod rotation axis and is connected with the connecting rod for rotation about a connecting rod rotation axis, wherein the coupling member has a bearing eye which receives the crankpin of the crankshaft and wherein a coupling angle between an imagined straight line through the coupling member rotation axis and the connecting rod rotation axis on the one hand and an imagined straight line through the coupling member rotation axis and the piston rod rotation axis on the other hand is at least 140 and at most 180. The invention further relates to an internal combustion engine with a multi-joint crank drive.

The multi-joint crank drive of the aforementioned type is for example a component of the combustion engine, but may also be used in other applications. The multi-joint crank drive includes the eccentric shaft whose rotation angle is preferably adjustable by means of an actuator, in particular in dependence on an operating point of the combustion engine. As an alternative or in addition the eccentric shaft can also be operatively connected with the crankshaft of the internal combustion engine and can thus be driven by the internal combustion engine. The multi-joint crank drive has the coupling member, in particular a number of coupling members that corresponds to the number of pistons of the internal combustion engine. The coupling member or the coupling members are respectively rotatably supported on the corresponding crankpin of the crankshaft. Preferably the coupling member has two arms that protrude over the crankshaft on two opposing sides, and which are each provided at their ends with a pivot joint. Of course also other embodiments are conceivable. The rotation axis of the coupling member about the crankshaft or about the crankpin of the crankshaft is referred to as coupling member rotation axis.

One of the pivot joints serves for pivotal connection with the piston rod, which connects one of the pistons of the internal combustion engine with the crankshaft via the coupling member. The rotation axis of this pivot joint is referred to as piston rod rotation axis. Due to the pivotability of the coupling member the piston rod rotation axis is not fixed in position but is displaced or pivoted together with the coupling member. Another one of the pivot joints serves for pivotal connection with the co-called connecting rod, which is supported with its other end, which is opposite the coupling member, on the crankpin of the eccentric shaft. The rotation axis of this pivot joint is referred to as connecting rod rotation axis, while the rotation axis of the connecting rod on the crankpin of the eccentric shaft is hereinafter referred to as eccentric shaft rotation axis.

The connecting rod has for forming the pivot joints preferably two conrod eyes. The first conrod eye is a component of the pivot joint via which the connecting rod interacts with the coupling member. The first conrod eye hereby for example engages around a coupling pin or bearing pin, which is held on the coupling member. The second conrod eye, is analogously a component of the pivot joint via which the connecting rod is connected with the eccentric shaft. In particular the second conrod eye engages around the crankpin of the eccentric shaft at least in regions.

By means of the multi-joint crank drive the compression ratio that is achieved in the cylinder that is respectively assigned to the piston can be adjusted, in particular in dependence on an operating point of the internal combustion engine and/or the actual work cycle. For adjusting the compression ratio the eccentric shaft is caused to assure a defined rotary position that corresponds to the desired compression ratio and/or the phase position between the eccentric shaft and the crankshaft is set to a defined value.

The support of the coupling member on the crankshaft or the crankpin of the crankshaft is realized by means of the bearing eye. The bearing eye hereby is constructed for example in the form of a conrod eye. For example the bearing eye is realized as recess of he coupling member in which the crankpin is arranged and traverses, preferably completely, the bearing eye. The support of eh coupling member on the crankpin of the crankshaft is for example configured as sliding bearing. As an alternative also a rolling bearing possible.

From the state of the art for example the document DE 10 2005 054 761 A1 is known. This document describes an internal combustion engine with a piston which is displaceably arranged in a cylinder in a housing, and which is pivotally coupled with a piston rod whose movement is transferable to a crankpin of a crankshaft. Between the piston rod and the crankpin a transmission member is provided which is constructed as a transverse lever, which is coupled via a joint with the crankpin at a joint point. This joint is situated in a region between a first bearing point of the transverse lever to the piston rod and a second bearing point of the transverse lever to the auxiliary connecting rod and the joint is arranged between the transverse lever and the crankpin at a distance to the connecting line between the two bearing points of the transverse lever to the auxiliary connecting rod and the piston rod.

In a main view of the transverse lever, the transverse lever is superimposed with a plan orthogonal axis system, wherein the zero point of the axis system is arranged in the point of articulation. A first axis extends through the second bearing point. A second axis is perpendicular to the first axis. Both axes divide a drawing plane into four quadrants in a mathematically conventional manner. The first bearing point is arranged in the second quadrant and a center of mass of the transverse lever in the second, the third or the fourth quadrant. The movement of the transverse lever is conducted via the auxiliary connecting rod, which is pivotally supported in the housing on its end, which faces way form the transverse lever.

From the state of the art also the documents JP 2004-124775 A and EP 1 180 588 A2 are known.

Generally the configuration of the internal combustion engine and thus also of the multi-joint crank drive has the goal to reduce the weight, in particular of moving parts as far as possible in order to keep resulting mass forces and the resulting mass-proportional positional forces as low as possible.

SUMMARY OF THE INVENTION

It is therefore an object of the invention to propose a multi-joint crank drive of an internal combustion engine which has advantages compared to known configurations and is in particular characterized by a reduction of free second order inertia forces.

According to the invention this is achieved with a multi-joint crank drive with the features of the corresponding independent claim VI Hereby it is provided that a center of mass of the coupling member is arranged outside of the bearing eye, wherein the center of mass is arranged on a side of a plane which faces the piston of the internal combustion engine, which planes receives the coupling member rotation axis and the connecting rod rotation axis. The center point can generally be defined arbitrarily, however it particularly preferably corresponds to the center of mass, the center of gravity or the geometric center of the coupling member. In known embodiments the center point is located close to or in the bearing eye. By taking targeted measures however the displacement of the center point can be performed so that it is outside or further outside the bearing eye. These measures are exemplary explained below. Of course other measures can also be taken for a corresponding positioning of the center point.

It can for example be provided that the rotation axis of the eccentric shaft is situated above the plane, which receives a rotation axis of the crankshaft and is perpendicular to at least one cylinder longitudinal center axis. The plane is thus defined by the rotation axis of the crankshaft together with the cylinder longitudinal center axis. In longitudinal direction of the internal combustion engine—in relation to the rotation axis of the crankshaft—the plane has the same position and direction as this rotation axis. At the same time the plane is to be perpendicular to the at least one cylinder longitudinal center axis so that the cylinder longitudinal center axis is situated in normal direction of the plane. The cylinder longitudinal center axis is assigned to a cylinder of the internal combustion engine and extends in its longitudinal direction. The cylinder longitudinal center axis is for example located in the center of the cylinder and extends along its longitudinal axis.

Of course the plane can also be perpendicular to multiple cylinder longitudinal center axes of multiple cylinders of the internal combustion engine, particularly preferably it can be perpendicular to the cylinder longitudinal center axes of all cylinders of the internal combustion engine. The eccentric shaft is to be arranged so that its rotation axis is situated above this plane. Particularly preferably the rotation axis of the eccentric shaft is situated directly adjacent the plane, i.e., it adjoins the plane. As an alternative this is the case for the entire eccentric shaft. It can also be provide that the rotation axis of the eccentric shaft or the entire eccentric shaft is situated above the plane and is spaced apart from the plane.

In such a configuration, the eccentric shaft is no longer arranged below a cylinder of the internal combustion engine but is rotated upwards together with the connecting rod. This preferably results in the fact that the piston rod and the connecting rod starting from the coupling member point substantially in the same direction, i.e., in the direction of the piston or the cylinder. It is thus not provided that the connecting rod starting from the coupling lever points away from the cylinder or the piston or is arranged opposite the piston with regard to the coupling lever.

It is provided that the center point is arranged on a side of a first plane, which faces the cylinder of the internal combustion engine and receives the coupling member rotation axis and the connecting rod rotation axis. The first plane is thus configured so that the coupling member rotation axis and the connecting rod rotation axis extend in this plane. The center point is arranged above this first plane when viewing the coupling member from the side in its mounted position in the internal combustion engine. Hereby it may be the case that the center point is arranged on the same side of the first plane as the piston rod rotation axis.

In a preferred embodiment of the invention the center point is arranged on the same side of a second plane as the connecting rod rotation axis, which second plane is perpendicular to the first plane and receives the coupling member rotation axis. The first plane and the second plane thus divide the coupling member into quadrants that are numbered in clockwise direction. For example the coupling member is configured so that its center point is located in a first one of the quadrants. The piston rod rotation axis on the other hand is preferably situated in a second one of the quadrants, while the connecting rod rotation axis, which is located in the first plane, is preferably also arranged in the first one of the quadrants.

An embodiment of the invention provides that the ratio between the distance of the center point from the coupling rotation axis and a radius of the bearing eye is more than 100%, at least 110%, at least 120%, at least 130%, at least 140% or at least 150%. Thus the distance between the center point and the coupling member rotation axis is first determined. This distance is put into relation with the diameter of the bearing eye so that this ratio results from dividing the distance by the radius. Because the center point is to be situated outside the bearing eye, the ratio has to be greater than 100%. Preferably the ratio is greater however. As an alternative or in addition to the aforementioned values the ratio can be at least 160%, at least 170%, at least 180%, at least 190% or at least 200%.

A further preferred embodiment of the invention provides that an additional mass is fastened on the coupling member. This additional mass represents an element that is produced separately from the coupling member and is for example only fastened on the coupling member during mounting of the multi-joint crank drive or the internal combustion engine. The additional mass can for example be form fittingly and/or materially bondingly connected with the coupling member. The form fitting connection is for example realized by a bolt, a screw connection or the like. The materially bonding connection can in particular be produced by welding, gluing or the like.

In a preferred embodiment of the invention the additional mass is made of a material with a greater density than the coupling member. While the center point can be influenced by arranging any additional mass, which is for example made of the same material as the coupling member, the volume of the additional mass is to be kept as small as possible in order to avoid unnecessarily increasing the required installation space for the multi-joint crank drive. This can be realized in that the additional mass is made of a different material than the coupling member for example of a material, which has a greater density than the coupling member. In particular the density is greater by 10%, 20%, 30%, 40% or greater than 50%.

A preferred embodiment of the invention provides that the additional mass is fastened on a cantilever of the coupling member or extends through the cantilever. The cantilever extends for example from a base body of the coupling member, i.e., it has a free end, which protrudes away from this base body. The cantilever is for example dimensioned smaller in axial direction—preferably in relation to the coupling member rotation axis—than further regions of the coupling member, in particular the base body. The additional mass can be fastened on the cantilever in a form-fitting manner. For this purpose the additional mass for example extends through the cantilever in particular in axial direction, completely, The additional mass and/or the cantilever are preferably arranged in the same quadrant as the center point, for example in the first one of the quadrants.

A further embodiment of the invention provides that the bearing eye is formed by a base body of the coupling member and a bearing cover, wherein the bearing cover is made of a material with a lower density than the base body. The coupling member is thus constructed in multiple parts and consists at least of the base body and the bearing cover which is connected with the base body. For example for fastening the bearing cover on the base body at least one screw connection, preferably at least two screw connections, are provided. In a preferred embodiment of the invention a bearing bushing can be arranged between the base body and the bearing cover, which bearing bushing itself engages around the crankpin of the crankshaft. As an alternative the base body and the bearing cover can of course also be in direct contact or sliding contact with the crankpin of the crankshaft.

The bearing eye is thus formed by the base body together with the bearing cover, wherein—when viewed in circumferential direction in relation to the coupling member rotation axis—the base body and the bearing cover preferably each provide half of the bearing eye. The bearing cover is preferably situated at least partially in the third and/or fourth one of the quadrants. Correspondingly the center point can be shifted in the direction of the first quadrant or further into the first quadrant when the bearing cover is constructed more lightweight. This can be achieved by a low density of the material of the bearing cover compared to the material of the base body.

Finally it can be provided that the bearing cover is arranged predominantly on the side of the first plane, which faces away from the piston. This was already indicated above using different words. The center point and the bearing cover thus are situated at least partially on different sides of the first plane. The predominant arrangement of the bearing cover on this side is accomplished by the fact that at least 50%, at least 60%, at least 70%, at least 80% or at least 90% of its mass are situated on this side of the first plane.

In a particularly preferred embodiment of the invention it can be provided that respectively with respect to a total piston lift of the piston the distance between the piston rotation axis and the piston rod rotation axis is at least 1.41 and at most 1.6 t1, and/or the distance between the piston rotation axis and the piston rod rotation axis is at least 1.41 and at most 1.61 and/or the distance between the piston rod rotation axis and the coupling member rotation axis is at least 0.38 and at most 0.58 and/or the distance between the coupling member rotation axis and the connecting rod rotation axis is at least 0.82 and at most 1.02 and/or the distance between the connecting rod rotation axis and the eccentric shaft rotation axis is at least 1.63 and at most 1.83. Preferably multiple of these conditions, in particular at least one of these conditions, particularly preferably all of these conditions are satisfied.

Known multi-joint crank drives are usually designed for optimal use of mounting space. As a result the kinematically active lengths of the multi-joint crank drive in relation to the piston lift of the piston are small. The forces in the pivot bearings of such a multi-joint crank drive are comparatively great and have to travel over a pong pivot angle and thus have to travel over a long distance. The resulting friction work, which is the product of force and travel, and is converted into heat is thus also very high. When at least one of the mentioned conditions is realized the friction of the multi-joint crank drive and/or the torsional stress to which the crank drive of the internal combustion engine is subjected can be reduced.

Of course as an alternative it can also be provided that only the mentioned distance between the piston rotation axis and the piston rod rotation axis or only the mentioned distance between the piston rod rotation axis and the coupling member rotation axis or only the mentioned distance between the coupling member rotation axis and the connecting rod rotation axis or only the mentioned distance between the connecting rod rotation axis and the eccentric rotation axis. Also any combination of the mentioned distances can be provided. For example at least two, in particular exactly two, of he mentioned distances or at least three, in particular exactly three of the mentioned distances are realized.

By means of the mentioned distances between the rotation axes it was surprisingly possible to improve the phase position of the maximal mass force of the crankshaft lever arm length prevailing at this time point so that the mass-force related torsion moment in the crankshaft significantly decreases, in particular by at least 10%, at least 20% or at least 30%.

Of course the distance between the piston rotation axis and the piston rod rotation axis—in relation to the total piston lift—can be at least 1.46 and at most 1.56, or at least 1.49 and at most 1.53, particularly preferably 1.51.

In addition or as an alternative the distance between the piston rod ration axis and the coupling member rotation axis—in relation to the total piston lift—can be at least 0.43 and at most 0.53, in particular at least 0.46 and at most 0.50, particularly preferably 0.48.

In a further embodiment it can be provide that the distance between the coupling member rotation axis and the connecting rod rotation axis—in relation to the total piston lift—is at least 0.87 and at most 0.97, in particular at least 0.90 and at most 0.94, particularly preferably 0.92.

Finally it can be provided that the distance between the connecting rod rotation axis and the eccentric rotation axis—in relation to the total piston lift—is at least 1.68 and at most 1.78, in particular at least 1.71 and at most 1.75, particularly preferably 1.73.

A further embodiment of the invention provides that in relation to the total piston lift the horizontal distance between the rotation axis of the eccentric shaft and the rotation axis of the crankshaft—in relation to the total piston lift—is at least 0.64 and at most 0.84. The horizontal distance is hereby for example in a direction which is perpendicular to the cylinder longitudinal center axis. The stated values are to be understood as absolute values. For example the stated distance is at least 0.69 and at most 0.79, in particular at least 0.72 and at most 0.76, particularly preferably 0.74.

A further embodiment of the invention provides that t in relation to the total piston lift the vertical distance between the rotation axis of the eccentric shaft and the rotation axis of the crankshaft is at least 1.67 and at most 2.07. The vertical distance is preferably in a direction, which is parallel to the cylinder longitudinal center axis. Also in this case the stated values are to be understood as absolute values. Particularly preferably however the rotation axis of the eccentric shaft is situated above the rotation axis of the crankshaft, i.e., starting form the crankshaft in the direction of the piston or the cylinder. The stated distance is preferably at least 1.72 and at most 2.02, in particular at least 1.85 and at most 1.89, particularly preferably 1.87, respectively in relation to the total piston lift.

An embodiment of the invention provides that in relation to the total piston lift the distance between the coupling member rotation axis and the rotation axis of the crankshaft is at least 0.23 and at least 0.43. The stated distance corresponds to a crank radius of the crankshaft, i.e. to the distance between the crankpin and the crankshaft, and the rotation axis of the crankshaft. The stated distance is preferably at least 0.28 and at most 0.38 in particular at least 0.31 and at most 0.35, particularly preferably 0.33.

In a particularly preferred embodiment of the invention it is provided that in relation to the total piston lift an offset is at least 0.11 and at most 0.31. The term offset means a parallel displacement of the rotation axis of the crankshaft relative to the cylinder longitudinal center axis or the piston longitudinal center axis. The rotation axis of the crankshaft thus coincides with the cylinder longitudinal center axis or the cylinder longitudinal center axis at an offset of zero. At an offset of greater than zero on the other hand it is spaced apart from the longitudinal center axis or the cylinder longitudinal center axis. The offset is preferably 0.16 and at most 0.26, in particular at least 0.19 and at most 0.23, particularly preferably 0.21 in relation to the total piston lift.

Hereby it can be provided that the offset is present on the minor thrust face, in particular the rotation axis of the crankshaft is arranged on the side of the piston longitudinal center axis which faces the eccentric shaft. Generally it is possible that the offset is either provided on the pressure side or the counter pressure side. Of course within the scope of the invention both embodiments can also be realized. Particularly preferably however the offset is present toward the counter pressure side.

A particularly preferred embodiment of the invention provides that a coupling angle between an imagined straight line through the coupling member rotation axis and the connecting rod rotation axis on one hand and an imagine straight line through the coupling member rotation axis and the piston rod rotation axis n the other hand is at least 140° and at most 180°. The coupling angle essentially describes the angle between two arms of the coupling member relative to each other. A first arm hereby connects the coupling member rotation axis with the connecting rod rotation axis, while a further arm connects the coupling member rotation axis and the piston rod rotation axis with each other.

The coupling angle is characterized by the two imagined lines, wherein these two imagined straight lines respectively extend through two of the mentioned rotation axes, i.e., the coupling member rotation axis and the connecting rod rotation axis on one hand and the coupling member ration axis and the piston rod ration axis on the other hand. The coupling angle is in particularly preferably at least 150° and at most 170°, in particular at least 155° and at most 165°, particularly preferably 160°.

A further embodiment of the invention provides that in relation to the total piston lift the distance between the rotation axis of the eccentric shaft and the eccentric rotation axis is at least 0.045 and at most 0.065. The distance insofar characterizes a crank radius of the eccentric shaft, i.e., a distance between the crank pion of the eccentric shaft and the rotation axis of the eccentric shaft. For example the stated distance is at least 0.05 and at most 0.06, in particular at least 0.051 and at most 0.057, particularly preferably it is 0.055.

Finally it can be provide that the total piston lift is 70 mm and at most 120 mm. of course the total piston lift can generally be any length and can be selected in dependence on the intended power of the internal combustion engine. For example the total piston lift is however between the stated values (inclusive these values) or it is at least 80 mm and at most 110 mm, in particular at least 90 mm and at most 100 mm. it can however also be at least 91 mm and at most 95 mm, particularly preferably 93.5 mm.

The invention also relates to an internal combustion engine with a multi-joint crank drive. Hereby it is provided that the multi-joint crank drive is configured according to the aforementioned description. The advantages of such a configuration of the multi-joint crank drive were already mentioned above. The internal combustion engine and also the multi-joint crank drive can be modified according to the description above so that reference is made thereto.

BRIEF DESCRIPTION OF THE DRAWING

In the following the invention is explained in more detail by way of the exemplary embodiments shown in the drawing without limiting the invention. It is shown in.

DETAILED DESCRIPTION OF PREFERRED EMBODIMENTS

Figure 1:
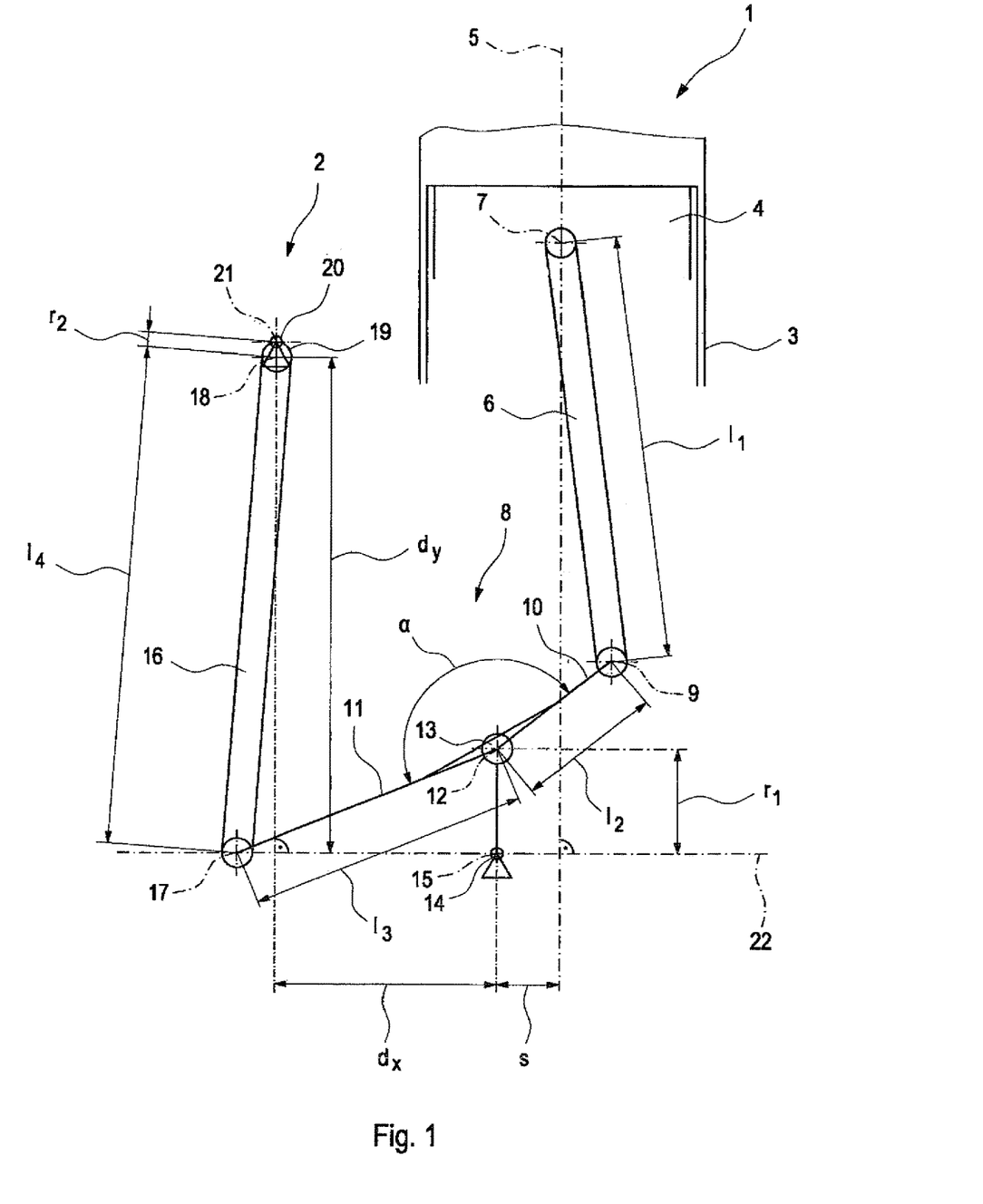
FIG. 1 a schematic representation of an internal combustion engine with a multi-joint crank drive, FIG. 2 a first embodiment of a coupling member of the multi-joint crank drive in a side view, FIG. 3 the first embodiment of the coupling member in an alternative view, FIG. 4 a second embodiment of the coupling member, FIG. 5 a third embodiment of the coupling member, and FIG. 6 a fourth embodiment of the coupling member

FIG. 1 shows a region of an internal combustion engine 1 with a multi-joint crank drive 2. The internal combustion engine 1 also has at least one piston 4, which is movable in a cylinder 3 in longitudinal direction. The cylinder 3 or the piston 4 has a longitudinal center axis 5. On the piston 4 a piston rod 6 engages, which is supported on the piston 4 for rotation about a piston rotation axis 7. The piston rotation axis 7 is hereby preferably located on the longitudinal center axis 5 of the cylinder.

On its side that faces away from the piston 4, the piston rod 6 is connected with a coupling member 8. Hereby the piston rod 6 is supported on the coupling member 8 for rotation about a piston rod rotation axis 9. In particular the piston rod 6 engages on a first arm 10 of the coupling member 8. The coupling member 8 is rigidly connected with a second arm 11 so as to form an angle α with the second arm. The angle α is hereby defined about a coupling member rotation axis 12. In this coupling member rotation axis 12 thus the two arms 10 and 11 converge. The coupling member 8 is supported on a crankpin 13 of a crankshaft 14 for rotation about a coupling member rotation axis 12. The crankpin 13 or the coupling member rotation axis 12 is hereby arranged eccentric relative to a rotation axis 15 of the crankshaft 14.

On the side of the coupling member 8, which faces away from the piston rod 6 a connecting rod 16 engages on the coupling member 8, in particular thus n the second arm 11. Hereby the connecting rod 16 is supported on the coupling member 8 for rotation about a connecting rod rotation axis. On the side of the connecting rod 16, which faces away from the coupling member, the connecting rod 16 is supported on a crankpin 19 of an eccentric shaft 20 for rotation about an eccentric shaft rotation axis 18. The crankpin 19 or the eccentric shaft rotation axis 18 are situated eccentric relative to the rotation axis 21 of the eccentric shaft 20.

It is provided that the rotation axis 21 of the eccentric shaft 20 is arranged above a plane 22, which receives the rotation axis 15 of the crankshaft 15 and is perpendicular to the cylinder longitudinal center axis 5. This arrangement is referred to as above arranged eccentric shaft.

In the Figure a distance between the piston rotation axis 7 and the piston rod rotation axis 9 is designated $l_2$. The distance between the piston rod rotation axis 9 and the coupling member rotation axis 12 is stated as $l_2$. The distance between the coupling member rotation axis 12 and the connecting rod rotation axis 17 is designated $l_3$ and the distance between the connecting rod rotation axis 17 and the eccentric rotation axis 18 as $l_4$. Particularly preferably the following relationship applies to these distances:

$$1.41 \leq l_1 \leq 1.61,$$

and/or $$0.38 \leq l_2 \leq 0.58,$$

and/or $$0.82 \leq l_3 \leq 1.02,$$

and/or $$1.63 \leq l_4 \leq 1.83.$$

The stated values are hereby in relation to a total piston lift of the piston 4, which is for example at least 70 mm and at most 120 mm.

It can also be provided that a horizontal distance $dx$ between the rotation axis 21 of the eccentric shaft 20 and the rotation axis 15 of the crankshaft 14 in relation to the total piston lift of the piston 4 is at least 0.64 and at most 0.84. In addition or as an alternative the vertical distance $d_y$ between the rotation axis 21 of the eccentric shaft 20 and the rotation axis 15 of the crankshaft 14 is at least 1.64 and at most 2.07 again in relation to the total piston lift.

It can also be provided that in relation to the total piston lift the crank radius of the crankshaft 14, i.e. the distance between the coupling member rotation axis 12 and the rotation axis 15 of the crankshaft 14 is at least 0.23 and at most 0.43. This crank radius is here designated $r_1$. Also the eccentric shaft 20 has a lift, which is referred to as $r_2$ and is defined as the distance between the eccentric rotation axis 18 and the rotation axis 21 of the eccentric shaft 20. The crank radius $r_2$ of the eccentric shaft 20 is—in relation to the total piston lift—for example at least 0.045 and at most 0.065.

In addition in the here described multi-joint crank drive 2 a offset s can be provided which is insofar defined as the distance between the rotation axis 15 of the crankshaft 14 and the cylinder longitudinal center axis 5. The offset s, in relation to the total piston lift, is for example at least 0.11 and at most 0.31. Hereby the offset s is present on the side toward the counter pressure side. The rotation axis 15 of the crankshaft 14 is thus arranged on the side of the longitudinal center axis 5 on which also the rotation axis 21 of the eccentric shaft 20 is located.

The coupling angle alpha mentioned above is define by the sectional angle between the imagined straight line, which extends through the coupling member rotation axis 12 and the connecting rod axis 17, with an imagined straight line, which extends through the coupling member axis 12 and the piston rod rotation axis 9. The coupling angle $\alpha$ is at least 140 degrees and at most 180 degrees, however it can of course be selected as desired.

The here shown internal combustion engine 1 of course has preferably multiple cylinders 3 and thus multiple pistons 3. Correspondingly the multi-joint crank drive 2 has multiple elements assigned to it, in particular for each piston 4 a piston rod 6, a coupling member 8 and a connecting rod 16. These mentioned elements are respectively configured according to the above description. Generally the number of the cylinders 3 of the pistons 4 of the internal combustion engine 1 can be selected arbitrarily. This number is in particular 2, 3, 4, 5, 6, 8 or 12. When the internal combustion engine 1 is configured with four cylinders the crank angle of the crankshaft 14 is preferably 180 degrees.

Figure 2:
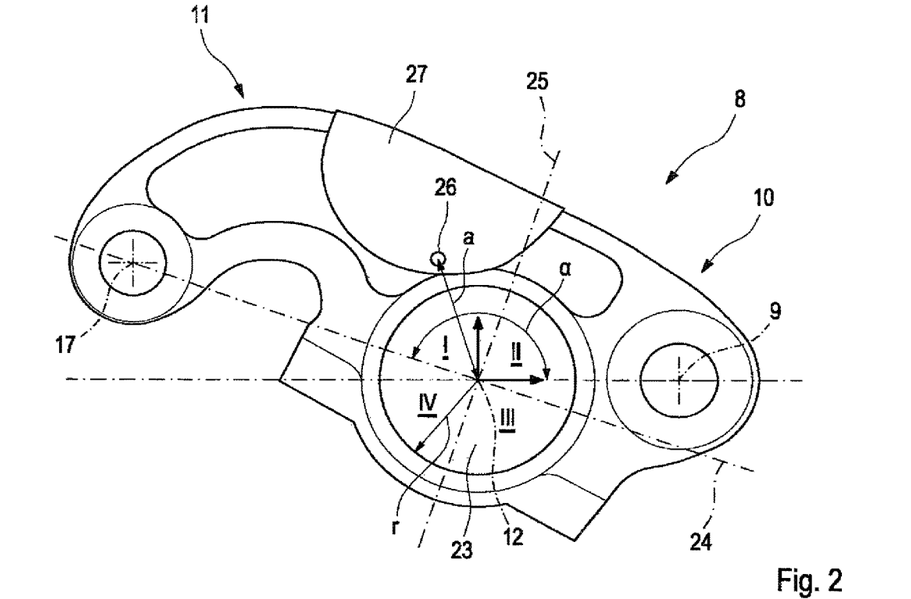

FIG. 2 shows a side view of the coupling member 8 in a first embodiment. It can be seen that the coupling member 8 has a bearing eye 23, which after mounting of the internal combustion engine 1 receives the crankpin 13 of the crankshaft 14. A first plane 24 is defined by the coupling member rotation axis 12 and the connecting rod rotation axis 17. Hereby the plane 24 is arranged so that it receives these two rotation axes 12 and 17. A second plane 25 is perpendicular to this first plane 24 and is arranged so that it also receives the coupling member rotation axis 12. The two panes 24 and 25 thus define four quadrants I, II, II and IV which are also indicated.

The coupling member 8 is configured so that a center point 26 of the coupling member 8 is arranged outside of the bearing eye 23. This means that for example the ratio between the distance a of the center point 26 from the coupling member rotation axis 12 to the radius r of the bearing eye 23 is more than 100%, at least 110%, at least 120%, at least 130%, at least 140% or at least 150%. The desired arrangement oft center point 26 in the case of the first embodiment is realized by the arrangement of an additional mass 27 on the coupling member 8.

Figure 3:
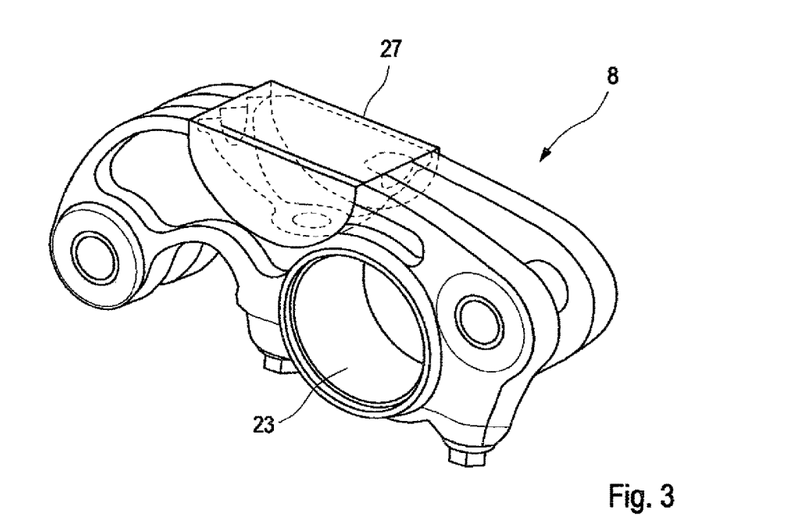

FIG. 3 shows a further view of the first embodiment of the coupling member 8. Hereby the additional mass 27 can be clearly seen, which is for example form fittingly connected with the coupling member 8. In addition or as an alternative of course a materially bonding connection can be established.

Figure 4:
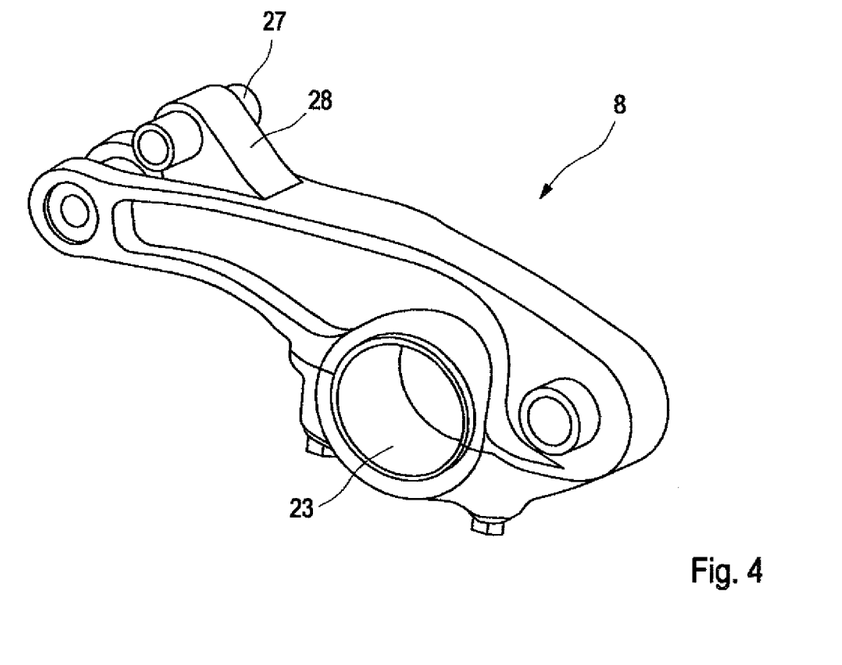

FIG. 4 shows a second embodiment of the coupling member 8. Generally reference is made to the description above. In contrast to the first embodiment the second embodiment has a cantilever 28, which extends into the quadrant I and is hereby oriented away from the coupling member rotation axis 12. The additional mass 27 is fastened on the cantilever 28, in particular form fittingly. For this purpose the additional mass for example extends through the cantilever 28. Preferably the additional mass 27 is configured circular cylindrical. In the exemplary embodiment a longitudinal center axis of the additional mass 27 is preferably arranged parallel to the coupling member rotation axis 12.

Figure 5:
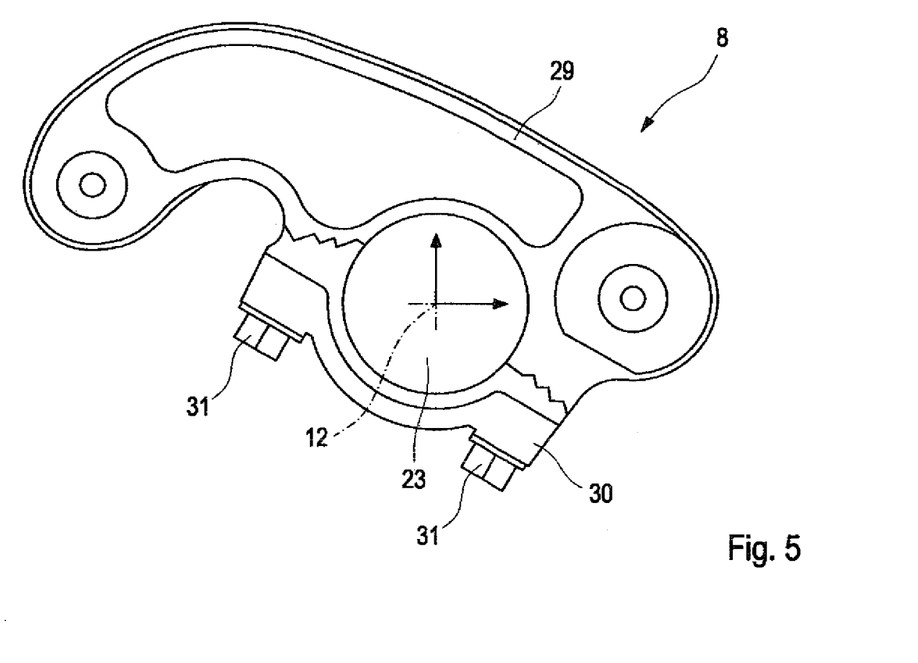

FIG. 5 shows a third embodiment of the coupling member 8. Reference is again made to the description above. In the third embodiment the coupling member 8 has a base body 29 and a bearing cover 30. The base body 29 and the bearing cover 30 together form the bearing eye 23 or engage around the bearing eye. The bearing cover 30 is for example fastened on the base body for example with at least one screw connection 31, preferably with at least two screw connections 31. It can be seen that the bearing cover 30 is predominantly arranged in the quadrants III and IV. The bearing cover 30 is made of a material, which has a lower density than the material of the base body 29. Correspondingly the center point 26 (here not shown) of the coupling member rotation axis 12 can be shifted into the quadrant I.

Figure 6:
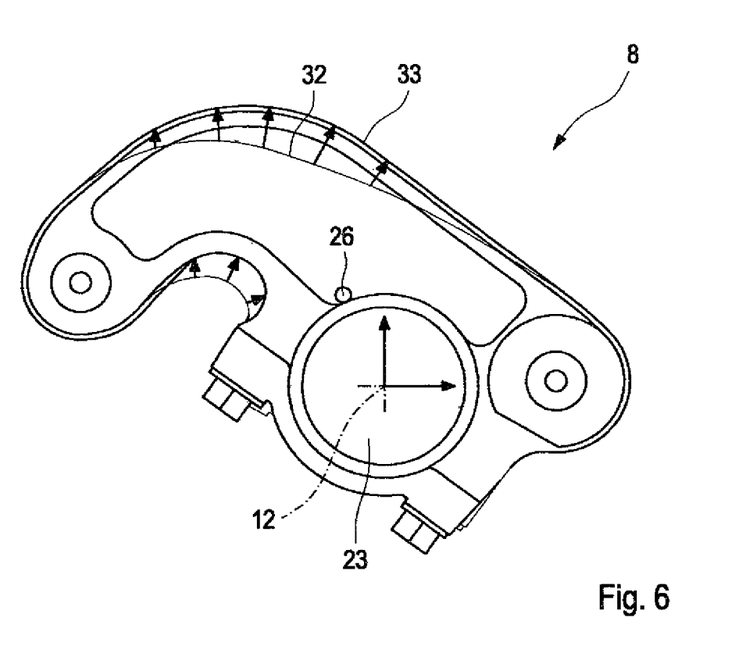

FIG. 6 shows a fourth embodiment of the coupling member 8. Also in this case reference is made to the description above. A contour 32 here indicates the outer contour of the coupling member 8 according to the first embodiment without the additional mass 27. In order to achieve the desired arrangement of the center point 26 also without this additional mass 27 a contour 33 of the coupling member 8 is selected so that the desired center point 26 results from the mass distribution of the coupling member 8.

LIST OF REFERENCE SIGNS 1 internal combustion engine
2 multi-joint crank drive
3 cylinder
4 piston
5 piston longitudinal center axis
6 piston rod
7 piston rotation axis
8 coupling member
9 piston rod
10 rotation axis
11 1. Arm
12 2. Arm
13 coupling member rotation axis
14 crankpin
15 crankshaft
16 rotation axis
17 connecting rod
18 connecting rod
19 rotation axis
20 eccentric rotation axis
21 crankpin
22 eccentric shaft
23 rotation axis
24 plane
25 bearing eye
26 1. Plane
27 2. Plane
28 center point
29 additional mass
30 cantilever
31 base body
32 bearing cover
33 screw connection
34 contour
35 contour

What is claimed is:
1. A multi-joint crank drive of an internal combustion engine comprising:
at least one coupling member rotatably supported on a crankpin of a crankshaft for rotation about a coupling member rotation axis;
at least one connecting rod supported on a crankpin of an eccentric shaft for rotation about an eccentric rotation axis,
wherein the coupling member is connected with a piston rod of a piston of the internal combustion engine for pivoting about a piston rod rotation axis and with the connecting rod for rotation about a connecting rod rotation axis, said coupling member having a bearing eye receiving the crankpin of the crankshaft, wherein a coupling angle between an imagined straight line though the coupling member rotation axis and the connecting rod rotation axis and an imagined straight line through the coupling member rotation axis and the piston rod rotation axis is at least 140° and at most 180°, wherein a center point of the coupling member is arranged outside the bearing eye, and on a side of a first plane which faces the piston of the internal combustion engine, said first plane receiving the coupling member rotation axis and the connecting rod rotation axis, and
an additional mass fastened on the coupling member predominantly on the side of the first plane which faces the piston,
wherein a ratio between a distance of the center point to the coupling member rotation axis and a radius of the bearing eye is between 100% and 200%.

2. The multi-joint crank drive of claim 1, wherein the center point is arranged on a same side of a second plane as the connecting rod rotation axis, said second plane being perpendicular to the first plane and receiving the coupling member rotation axis.

3. The multi-joint crank drive of claim 1, wherein the additional mass is made of a material with a greater density than the coupling member.

4. The multi-joint crank drive of claim 1, wherein the additional mass is fastened on a cantilever of the coupling member and/or traverses the cantilever.

5. The multi-joint crank drive of claim 1, wherein the bearing eye is formed by a base body of the coupling member and a bearing cover, said bearing cover being made of a material with a lower density than the base body.

6. The multi-joint crank drive of claim 5, wherein the bearing cover is predominantly arranged on a side of the first plane which faces away from the piston.

7. An internal combustion engine, comprising:
a multi-joint crank drive, said multi-joint crank drive comprising at least one coupling member rotatably supported on a crankpin of a crankshaft for rotation about a coupling member rotation axis; at least one connecting rod supported on a crankpin of an eccentric shaft for rotation about an eccentric rotation axis, wherein the coupling member is connected with a piston rod of a piston of the internal combustion engine for pivoting about a piston rod rotation axis and with the connecting rod for rotation about a connecting rod rotation axis, said coupling member having a bearing eye receiving the crankpin of the crankshaft, wherein a coupling angle between an imagined straight line though the coupling member rotation axis and the connecting rod rotation axis and an imagined straight line through the coupling member ration axis and the piston rod rotation axis is at least 140° and at most 180°, wherein a center point of the coupling member is arranged outside the bearing eye, and on a side of a first plane which faces the piston of the internal combustion engine, said first plane receiving the coupling member rotation axis and the connecting rod rotation axis, and an additional mass fastened on the coupling member predominantly on the side of the first plane which faces the piston,
wherein a ratio between a distance of the center point to the coupling member rotation axis and a radius of the bearing eye is between 100% and 200%.

* * * * *

UNITED STATES PATENT AND TRADEMARK OFFICE
CERTIFICATE OF CORRECTION

PATENT NO. : 10,184,395 B2
APPLICATION NO. : 15/118699
DATED : January 22, 2019
INVENTOR(S) : Matthias Brendel and Markus Meyer Page 1 of 1

It is certified that error appears in the above-identified patent and that said Letters Patent is hereby corrected as shown below:

In the Claims

In Column 12, Claim 1, Line 11, replace "though" with --through--.

In Column 12, Claim 7, Line 59, replace "though" with --through--.

In Column 12, Claim 7, Line 61, replace "ration" with --rotation--.

Signed and Sealed this
Twenty-fifth Day of June, 2019

Andrei Iancu
*Director of the United States Patent and Trademark Office*